May 29, 1956   J. J. MORSCH   2,747,427
THROTTLE PEDAL DEPRESSING DEVICES
Filed Aug. 17, 1953   2 Sheets-Sheet 1

INVENTOR.
JESSE J. MORSCH
BY
ATTORNEY

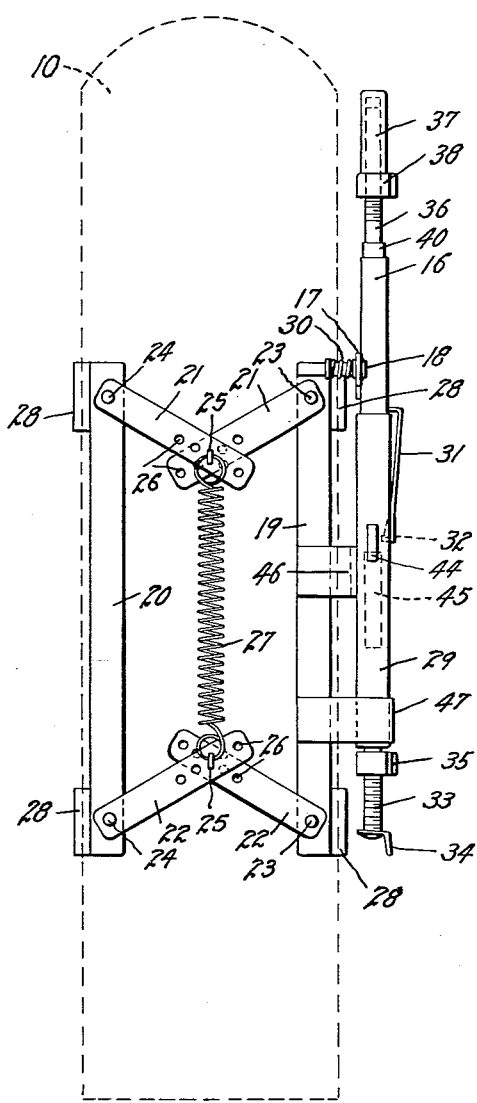
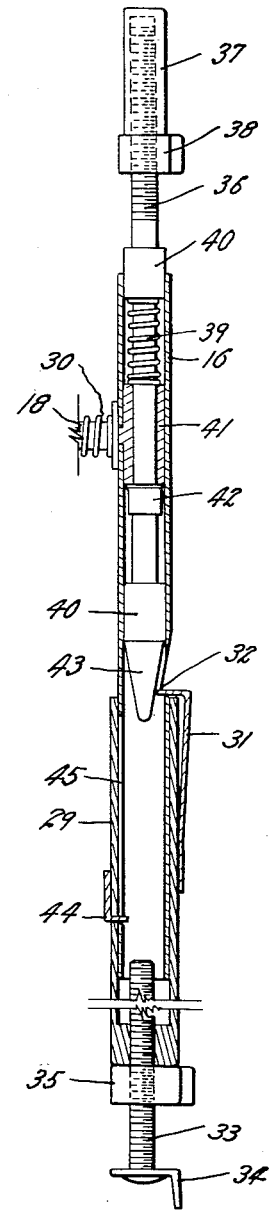
FIG. 3.
FIG. 4.
INVENTOR.
JESSE J. MORSCH
BY
ATTORNEY

United States Patent Office 2,747,427
Patented May 29, 1956

2,747,427

THROTTLE PEDAL DEPRESSING DEVICES

Jesse J. Morsch, Douglas, Wyo.

Application August 17, 1953, Serial No. 374,630

8 Claims. (Cl. 74—529)

The majority of present day automobiles are not equipped with a hand trottle. It is therefore difficult to maintain desired engine speeds during repairing, checking, and tuning operations, since the only throttle provided requires foot pressure, and the mechanic cannot maintain the foot pressure and observe the engine operation simultaneously.

This invention relates to a throttle pedal-depressing device, and has for its principal object the provision of a simple and highly efficient attachment which can be quickly and easily attached to the throttle pedal of an automotive vehicle, and which will maintain the pedal at any desired degree of depression during engine checking operations.

Another object is to provide a device of the above character which can, if desired, be allowed to remain on the throttle pedal and which will not interfere with the normal operation thereof in any way.

A further object of the invention is to so construct the improved depressor that it will automatically release itself should either the brake pedal or the accelerator pedal be inadvertently depressed while the device is in place.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 3 is an enlarged, bottom view of the device as it would appear in place on a throttle pedal; and Fig. 4 is a still further enlarged, longitudinal section of a staff portion employed on the improved pedal-depressing device illustrating it in the extended position.

Figure 1:
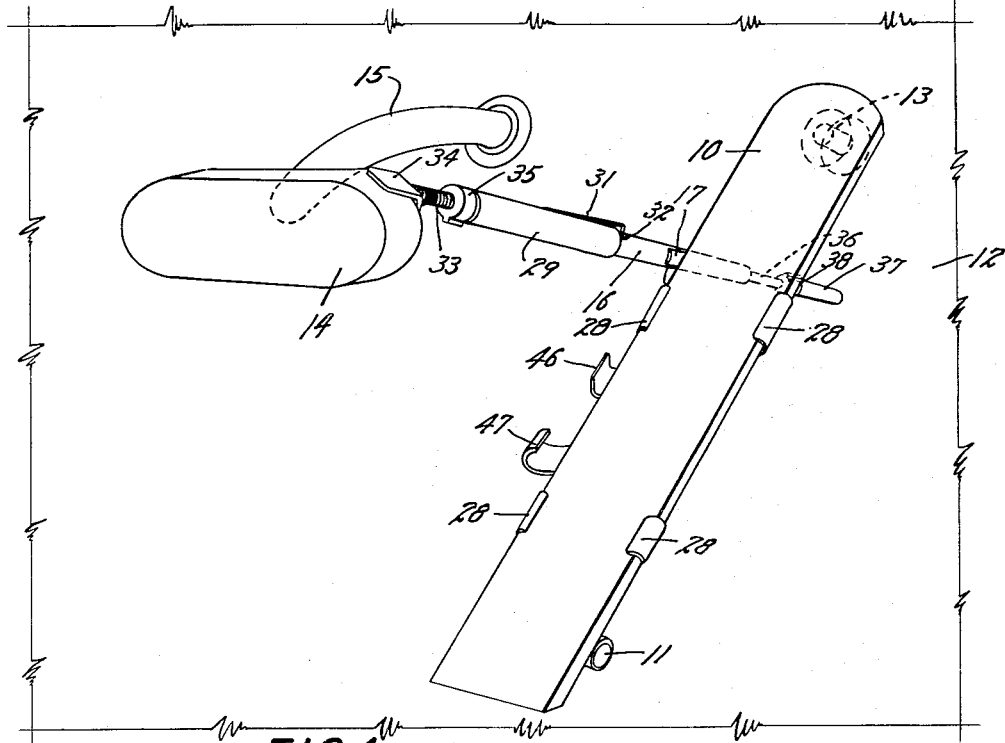
Fig. 1 is a perspective view of the forward portion of the floor board of a conventional automotive vehicle, illustrating the improved pedal-depressing device as it would appear in the depressed position.
Figure 2:
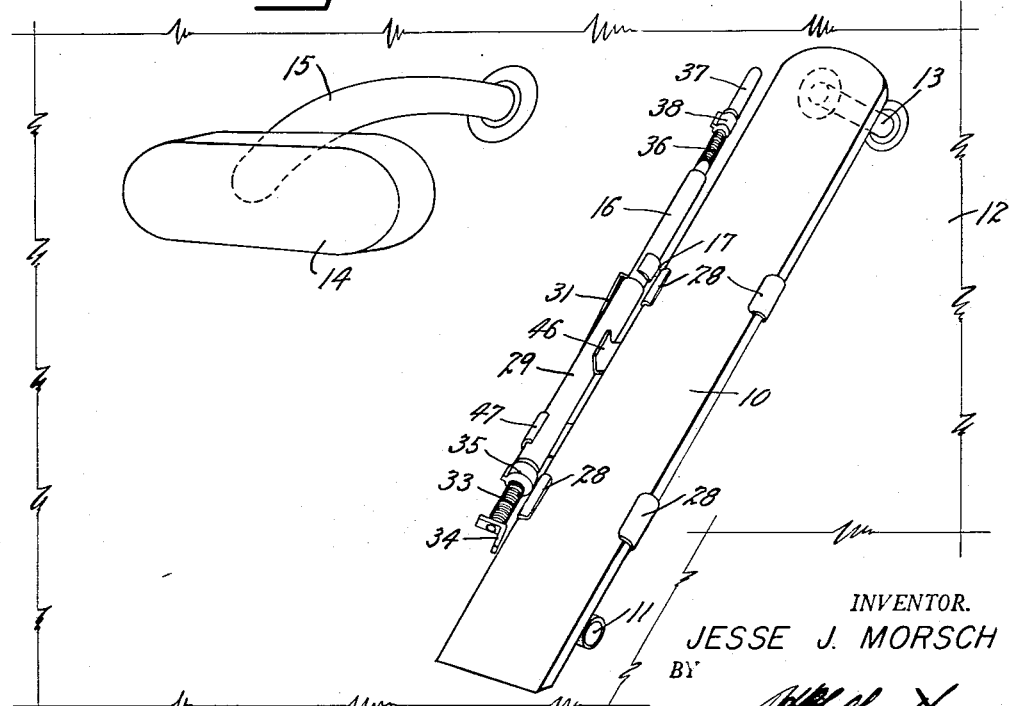
Fig. 2 is a similar view, illustrating the improved depressing device as it would appear in the out-of-service position.

In the drawing, a conventional automotive throttle pedal is indicated at 10. Such pedals are hinged, as indicated at 11, adjacent their lower extremities to the floor of the vehicle, indicated at 12, and are designed to depress a throttle push rod 13. Also illustrated in the drawing is a conventional vehicle brake pedal 14 mounted on the usual brake lever 15 forwardly of the driver's position.

The improved throttle pedal-depressing device comprises a clamp member adapted to be attached to the throttle pedal 10 and a staff member adapted to react against the brake pedal 15 for holding the throttle pedal depressed.

The clamp member of the device employes a first frame member 19 connected to a second parallel frame member 20 by means of two pairs of hinged toggle links 21 and 22. One link of each pair is hingedly connected to the first frame member 19 by means of a hinge rivet 23, and the second link of each pair is hingedly connected to the second frame member 20 by means of a similar hinge rivet 24. The two links of each pair are connected together by means of a removable cotter key 25. The cotter keys 25 extend through overlapping openings 26 in the links 21 and 22. The plurality of openings 26 allow the positions of the cotter keys 25 to be varied to accommodate various widths of pedals 10.

The two pairs of links 21 and 22 are constantly drawn together by means of a tension spring 27 connected between the two cotter keys 25 so that the two frame members 19 and 20 are constantly urged together. Each of the frame members is provided with two pedal-engaging hooks 28 adapted to engage the sides of the pedal 10 and to be drawn snugly thereagainst by means of the action of the spring 27.

The staff member of the improved depressor comprises an inner, elongated tube 16 provided with a hinge ear 17. The hinge ear 17 is rotatably mounted on a hinge stud 18 projecting outwardly from the upper extremity of the first frame member 19. A compression spring 30 acts between the frame member 19 and the ear 17 to urge the ear outwardly and prevent vibration thereof.

An outer tube 29 is telescopically fitted over the inner tube 16. The outer tube 29 can be withdrawn from the inner tube 16 a predetermined distance and latched in the withdrawn or extended position by means of an L-shaped latch spring 31 secured on the outer tube 29, the L-shaped head of which is positioned to engage in a receiving notch 32 in the inner tube 16.

A first threaded rod 33 is threaded into and extends outwardly from the outer tube 29, terminating in a pedal-engaging shoe 34. A jam nut 35 is threaded on the threaded rod 33 and may be threaded against the extremity of the outer tube 29 to lock the rod 33 at any desired degree of extension.

A second threaded rod 36 extends from the extremity of the inner tube 16, terminating in an elongated threaded adjustment cap 37 which may be clamped at any desired degree of extension on the rod 36 by means of a second jam nut 38. The second threaded rod 36 is constantly urged outwardly from the inner tube 16 by means of a compression spring 39 which acts between an enlargement 40 on the rod 36 and an internal bushing 41 in the inner sleeve 16. Outward movement of the threaded rod 36 is limited by a set collar 42 secured on the rod and positioned to contact the bushing 41.

The inner extremity of the rod 36 terminates in a cylindrical wedge member 43, the point of which extends axially beneath the L-shaped extremity of the latch spring 31. The extreme inward and outward movements of the inner tube 16 within the outer tube 29 are limited by means of lug 44 which extends into a longitudinally extending slot 45 formed in the inner tube 16.

The first frame member 19 of the clamping portion is provided with a sleeve-receiving hook 47 and a resilient retaining blade 46 which acts to hold the outer tube 29 in the hook 47.

The device is installed by pulling the two frame members 19 and 20 apart and passing them beneath the throttle pedal 10 until the hooks 28 engage the two sides of the pedal. The frame members are then released, allowing the spring 27 to draw them together so that the hooks 28 will be firmly locked in place against the sides of the pedal.

The outer tube 29 is now pulled outwardly from the inner tube until the latch spring 31 engages the notch 32. The extension of the first threaded rod 33 is then adjusted and set by the jam nut 35 so that when the shoe 34 is positioned against the back of the brake pedal 14, the throttle pedal 10 will be depressed to the desired running position. The threaded cap 37 is now adjusted on the second threaded rod 36 until it rests against the floor 12, and the cap is locked in this position by means of the jam nut 38. No further adjustments are required for this particular vehicle.

It can be seen that the throttle pedal 10 will be held depressed as long as the shoe 34 engages the brake pedal 14. Let us assume that the operator no longer requires the device. He simply depresses the brake pedal 14. This forces the inner tube 16 over the second threaded rod 36 against the action of the spring 39 until the L-shaped extremity of the latch spring 31 rides outward on the incline of the wedge member 43 sufficiently to become disengaged from its retaining notch 32 in the inner tube 16. This allows the outer tube to telescope over the inner tube to shorten the overall length of the staff portion of the device.

Now, when the brake pedal 14 is released, the shoe 34 will simply fall away from the pedal and drop into its receiving hook 47, where it will be retained by the retaining blade 46 until again required for use. It will be noted that when not in use, the device lies alongside the throttle pedal 10 without interfering with the normal use of the latter.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A device for holding the throttle pedal of an automotive vehicle in a depressed position comprising: a pedal clamp adapted to be clamped to the throttle pedal of said vehicle; an elongated inner tube member pivotally mounted on said clamp at one side of said pedal; an outer tube member telescopically fitted over said inner tube member; means on said outer tube member adapted to engage the brake pedal of said automotive vehicle; and latching means arranged to maintain said outer tube member in an extended position on the inner tube member sufficient to maintain said throttle pedal depressed by reaction against said brake pedal.

2. A device for holding the throttle pedal of an automotive vehicle in a depressed position as described in claim 1 having means for automatically releasing said latching means when said brake pedal is depressed.

3. A device for holding the throttle pedal of an automotive vehicle in a depressed position as described in claim 2 in which the releasing means comprises: a floor-engaging member slidably mounted in and projecting from said inner tube and adapted to engage the floor of said vehicle; and means on said floor-engaging means positioned to force said latching means from the latched position when said brake pedal is depressed.

4. A device for holding the throttle pedal of an automotive vehicle in a depressed position as described in claim 3 having a first threaded rod extending from said outer tube member and threaded into the latter so that the length of the device may be increased by unscrewing said rod.

5. A device for holding the throttle pedal of an automotive vehicle in a depressed position as described in claim 4 having a second threaded rod slidable within said inner tube member; an extension nut on said second threaded rod acting to increase the length of the latter toward said floor when desired; and spring means urging said second threaded rod outwardly from said inner tube member.

6. A device for holding the throttle pedal of an automotive vehicle in a depressed position as described in claim 5 having an L-shaped latch spring carried by said outer tube member and adapted to engage a receiving slot in said inner tube member when said tube members are in the extended position; and means on said second threaded rod positioned to engage and release said latch spring when said spring means is compressed.

7. A device for holding the throttle pedal of an automotive vehicle in a depressed position comprising: a clamping device adapted to be clamped to the throttle pedal; and an elongated staff member pivotally mounted on said clamping device and adapted to extend into contact with and react against a second pedal of said automotive vehicle for maintaining said throttle pedal depressed; a floor-engaging portion mounted in and extending from one extremity of said staff member and positioned to engage the floor of said vehicle when the other extremity of said staff member is in engagement with said second pedal; and means for releasing said staff member from said second pedal when said floor-engaging portion is forced against the floor of said vehicle.

8. A device for holding the throttle pedal of an automotive vehicle in a depressed position comprising: a clamping device adapted to be positioned beneath the throttle pedal and to act to clamp against the side edges thereof; an elongated staff member pivotally mounted on said clamping device and adapted to extend into contact with and react against a second pedal of said automotive vehicle for maintaining said throttle pedal depressed; and receiving means mounted on said clamping device and positioned to receive said staff when the latter is released from said second pedal.

References Cited in the file of this patent

UNITED STATES PATENTS

| | | |
|---|---|---|
| 1,193,154 | Kirchhoff | Aug. 1, 1916 |
| 1,444,027 | Frederick | Feb. 6, 1923 |
| 1,476,393 | Cowdrey | Dec. 4, 1923 |
| 1,662,211 | Shier | Mar. 13, 1928 |
| 2,088,182 | Verch | July 27, 1937 |
| 2,503,802 | Coutcher | Apr. 11, 1950 |